US012177267B2

United States Patent
Ljung et al.

(10) Patent No.: US 12,177,267 B2
(45) Date of Patent: Dec. 24, 2024

(54) METHODS AND DEVICES FOR ESTABLISHING A STREAMING SESSION IN A FRAMEWORK FOR LIVE UPLINK STREAMING

(71) Applicant: Sony Corporation, Tokyo (JP)

(72) Inventors: Rickard Ljung, Lund (SE); Paul Szucs, Lund (SE)

(73) Assignee: Sony Group Corporation, Tokyo (JP)

( * ) Notice: Subject to any disclaimer, the term of this patent is extended or adjusted under 35 U.S.C. 154(b) by 585 days.

(21) Appl. No.: 17/275,321

(22) PCT Filed: Nov. 13, 2019

(86) PCT No.: PCT/US2019/061109
§ 371 (c)(1),
(2) Date: Mar. 11, 2021

(87) PCT Pub. No.: WO2020/102296
PCT Pub. Date: May 22, 2020

(65) Prior Publication Data
US 2022/0053033 A1 Feb. 17, 2022

Related U.S. Application Data

(60) Provisional application No. 62/760,631, filed on Nov. 13, 2018.

(51) Int. Cl.
*H04L 65/1069* (2022.01)
*H04L 65/61* (2022.01)
*H04L 65/65* (2022.01)

(52) U.S. Cl.
CPC .......... *H04L 65/1069* (2013.01); *H04L 65/61* (2022.05); *H04L 65/65* (2022.05)

(58) Field of Classification Search
CPC ......... H04L 69/03; H04L 65/65; H04L 65/61; H04L 69/24; H04L 65/1069
See application file for complete search history.

(56) References Cited

U.S. PATENT DOCUMENTS

2010/0274848 A1  10/2010  Altmaier et al.
2017/0230453 A1   8/2017  Verma et al.
(Continued)

FOREIGN PATENT DOCUMENTS

CN   106416280 A   2/2017
CN   107005797 A   8/2017

OTHER PUBLICATIONS

"Permanent Document Updating TR 26.939 per E-FLUS Agreements at SA4#99", 3rd Generation Partnership Project (3GPP), Oct. 2018, Kochi, India, S4-181175, 10 pages.
(Continued)

*Primary Examiner* — Syed Ali
(74) *Attorney, Agent, or Firm* — Tucker Ellis LLP

(57) ABSTRACT

A Framework for Live Uplink Streaming (PLUS) session between a PLUS source (100) and a PLUS sink (200) is initiated and controlled by the PLUS sink. The PLUS source registers with the PLUS sink and indicates its capabilities. The PLUS sink requests establishment of the session and further controls the session once established. The PLUS sink sends control requests that include control information to the PLUS source, thereby controlling media streaming at the PLUS source remotely.

12 Claims, 7 Drawing Sheets

(56) References Cited

U.S. PATENT DOCUMENTS

| | | | | |
|---|---|---|---|---|
| 2018/0367579 | A1* | 12/2018 | Kolan | H04L 65/61 |
| 2019/0173935 | A1* | 6/2019 | Lohmar | H04L 65/80 |
| 2020/0213371 | A1* | 7/2020 | Szucs | H04N 21/8456 |
| 2020/0351449 | A1* | 11/2020 | Oh | H04N 13/156 |
| 2020/0359395 | A1* | 11/2020 | Lohmar | H04W 28/0268 |

OTHER PUBLICATIONS

Office Action from corresponding Chinese Application No. 201980064454.6 mailed on Sep. 30, 2022.

International Search Report and Written Opinion from corresponding International Application No. PCT/US2019/061109 mailed on Feb. 6, 2020, 13 pages.

Sony Europe Limited, "E-FLUS: Media Production", 3rd Generation Partnership Project (3GPP), Nov. 2018, Busan, Korea, S4-181312, 5 pages.

"Guidelines on the Framework for Live Uplink Streaming", Technical Specification Group Services and System Aspects, 3rd Generation Partnership Project (3GPP), Sep. 2018, France, TR 26.939, V15.1.0, 30 pages.

"Uplink Streaming", Technical Specification Group Services and System Aspects, 3rd Generation Partnership Project (3GPP), Mar. 2018, France, TR 26.238, V15.1.0, 32 pages.

* cited by examiner

METHODS AND DEVICES FOR ESTABLISHING A STREAMING SESSION IN A FRAMEWORK FOR LIVE UPLINK STREAMING

RELATED APPLICATION DATA

This application claims the benefit of U.S. Patent Application No. 62/760,631, filed Nov. 13, 2018, the disclosure of which is incorporated herein by reference in its entirety.

TECHNICAL FIELD

The disclosure relates to a Framework for Live Uplink Streaming, FLUS. More specifically, the disclosure relates to methods for establishing and controlling a streaming session in a Framework for Live Uplink Streaming. The disclosure also relates to a corresponding electronic device, to a computer program for performing the method and to a computer program product.

BACKGROUND

The Framework for Live Uplink Streaming work item, or FLUS, was completed in standardization by the $3^{rd}$ generation partnership project (3GPP) in Release 15 and documented in 3GPP specification TS 26.238. FLUS enables live media streaming of various media types such as 360 video, VR, UHD video and multi-channel audio from a UE-based source entity to one or more sink entities. A FLUS sink entity may correspond to a recipient UE, or it may be a network server, which performs post-processing of the incoming media streams from the FLUS source, for subsequent distribution over 3GPP networks to recipient devices. Both MTSI (Multimedia Telephony Service for IMS) and non-MTSI instantiations of FLUS have been defined to support flexibility of implementations pertaining to both mobile operator managed and Over the Top (OTT) service offerings.

FLUS defines a FLUS source (e.g. a camera) entity and a FLUS sink entity that can support point-to-point transmission of speech/audio, video, and text. A FLUS source, according to an embodiment, can be implemented or provided by a device and originates a media stream. A FLUS sink, which may be implemented by another device, is a recipient of the media stream originating at the FLUS source. FLUS further defines media handling (e.g., signaling, transport, packet-loss handling, and adaptation). The goal is to ensure a reliable and interoperable service with a predictable media quality while allowing for flexibility in the service offerings.

The standardized version of FLUS is directed to a scenario where a UE (e.g. a camera) with a FLUS source can connect to a FLUS sink and start live uplink streaming of content that is captured by the UE or by a set of capture devices connected to the UE. This is e.g. useful in the "breaking news reporter" use case, which is essentially a professional media production application, but which focuses on a particular scenario of a single-camera ad hoc uplink from a remote location to the TV station or production facility. It has a justified place as a dedicated use case since it illustrates well the Network Assistance feature of FLUS to enable a FLUS source to stream with a best possible quality under current network conditions. For instance, the Network Assistance feature may involve a dedicated server function in an operator network and a dedicated client associated with the FLUS source. Network Assistance, for example, enables the FLUS source to request bitrate recommendations from the network and adapt the stream accordingly.

However, in the future, it may be desirable to extend the FLUS functionality for more advanced use cases.

SUMMARY

An object of embodiments herein is to extend the functionality of FLUS to allow it to be utilized better for the managed wireless uplink of media streams from capture devices to a media production system.

According to a first aspect the disclosure relates to a method for establishing a streaming session in a Framework for Live Uplink Streaming, FLUS. The method comprises registering the FLUS source at a FLUS sink and receiving, from a FLUS sink, a request to establish a FLUS session between the FLUS source and the FLUS sink. The method further comprises establishing the FLUS session, in response to receiving the request to establish a FLUS session, and streaming data, comprising media captured by the capture device, between the FLUS source and the FLUS sink using the established FLUS session. By letting the FLUS session establishment between a FLUS sink and selected FLUS sources be initiated from the FLUS sink the production may be made more efficient and the wireless resources may be used more efficient, as a production system may control which FLUS sources to use and when in time to establish a session.

In some embodiments, the method comprises receiving, from a FLUS sink, a request to provide FLUS source properties, and providing the FLUS source properties to the FLUS sink, in response to receiving the request to provide FLUS source capabilities. By discovering the capabilities of the FLUS sources that have registered at the FLUS sink, the FLUS sink will be able to efficiently select appropriate FLUS sources for the production and will have information on which possibilities there may be to (when applicable) control them during the production.

In some embodiments, the FLUS source properties comprises available video format(s), available audio format(s), available ancillary streams, connectivity capability and/or remote control capability. As the FLUS sink will obtain the capabilities for available FLUS sources, the production system may select suitable FLUS sources for a certain production.

In some embodiments, the established FLUS session comprises at least one of an uplink media stream, a downlink media stream and a voice communication stream (e.g between media capturing personnel and production personnel). Thus, further streams may be included in the FLUS session to enable e.g. feedback and/or communication in one single session. This will typically facilitate the set-up procedure and enable the communication that may be required between personal involved in a media capturing and production event.

In some embodiments, the method comprises receiving, form the FLUS sink, a request to control the FLUS session, and controlling the FLUS session, in response to receiving the request to control the FLUS session. Thereby, a production system may control the media capturing and streaming remotely during media production.

In some embodiments, the controlling comprises configuring the FLUS session. Thus, the production may directly configure the media streams to have desired properties, such as media format, bit-rate etc.

In some embodiments, the controlling comprises starting media streaming and/or stopping media streaming. Thereby, a production system may select when to receive a media stream from a particular FLUS source.

In some embodiments, the controlling comprises remotely controlling data streaming. Thereby, the production system may control streaming and capturing during the media streaming. For example, the quality of the stream and/or the optical settings of the capturing device may be adjusted.

In some embodiments, the method comprises receiving, from a FLUS sink, a request to terminate the FLUS session and terminating the FLUS session between the FLUS source and the FLUS sink, in response to receiving the request. Thereby, the FLUS session may be terminated directly, when not needed, whereby network bandwidth and power may be saved.

According to a second aspect the disclosure relates to a method for establishing a media streaming session in a Framework for Live Uplink Streaming, FLUS. The method comprises comprising registering a FLUS source at the FLUS sink and sending, to a FLUS source, a request to establish a FLUS session. The method further comprises establishing the FLUS session between the FLUS source and the FLUS sink, and streaming data between the FLUS source and the FLUS sink using the established FLUS session.

In some embodiments, the method comprises sending, to the FLUS source, a request to provide FLUS source properties, and receiving the FLUS source properties from the FLUS source.

In some embodiments, the established FLUS session comprises one or more of; an uplink media stream, a downlink media stream and a communication stream.

In some embodiments, the method comprises sending, to the FLUS source, a request to control the FLUS session.

In some embodiments the request is requesting the FLUS source to configure (or re-configure) the FLUS session.

In some embodiments the request is requesting the FLUS source to start or stop the media streaming.

In some embodiments the request is requesting the FLUS source to remotely controlling the media streaming.

In some embodiments, the method comprises sending, to a FLUS source, a request to terminate the FLUS session terminating the FLUS session.

DETAILED DESCRIPTION

Figure 1:
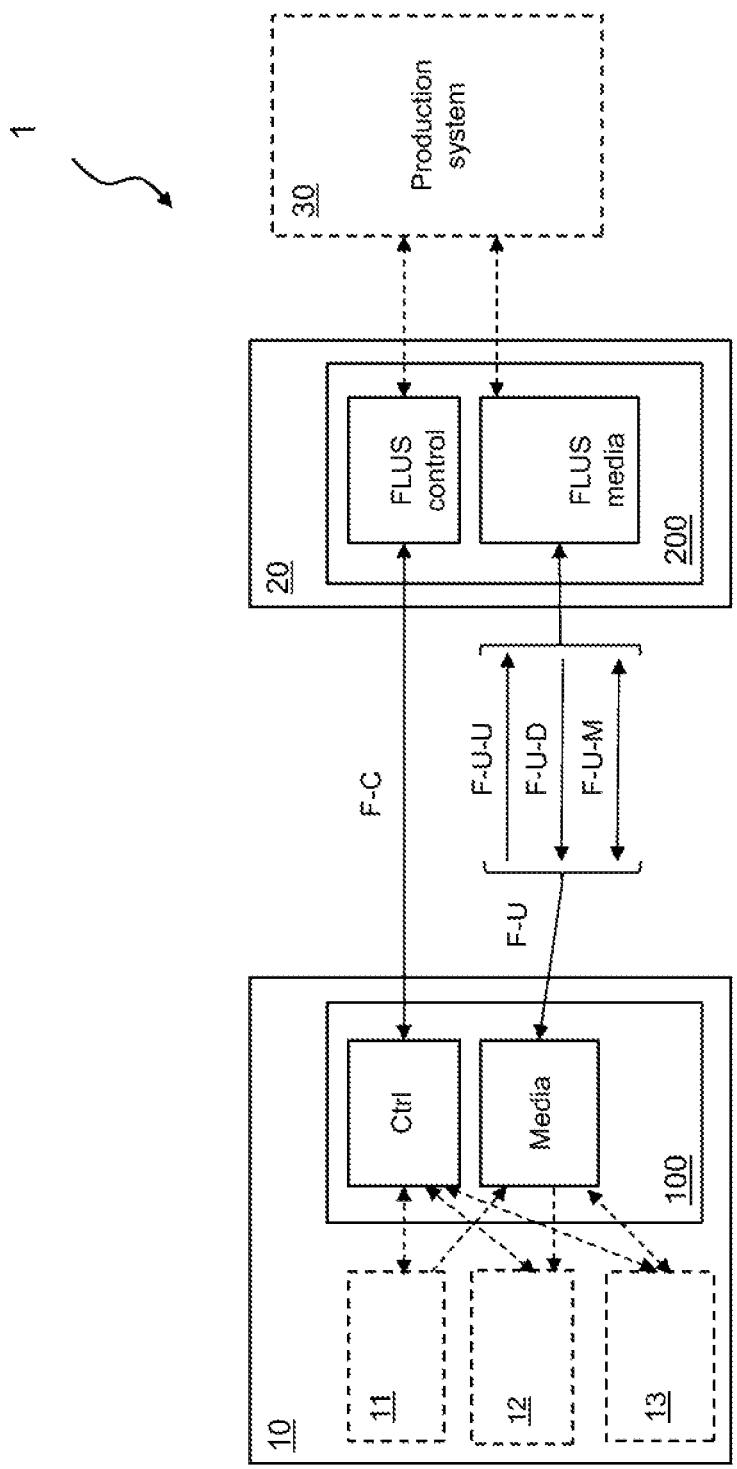
FIG. 1 illustrates a FLUS system comprising a FLUS source and a FLUS sink.

Embodiments will now be described with reference to the drawings, wherein like reference numerals are used to refer to like elements throughout.

For production of a media event (for example sports or musical performance), where media capture equipment is installed specifically for the coverage of the event, some media capture equipment will be connected via cabling, commonly coaxial cabling, optical fiber, or Gigabit-Ethernet. However, where it is more convenient and feasible some of this equipment can be connected wirelessly, e.g. using an LTE or new radio (NR) radio interface and e.g. using FLUS as the signaling framework on higher layer. Wireless connections offer the possibility to give spectacular vantage positions for the coverage, from places not easily accessible via cabling, more rapidly mobile coverage like from a shoulder-mounted camera, or from mobile unmanned vehicles like drones.

One example scenario is remote media production of a concert, where one or more contribution streams from FLUS sources (typically cameras and microphones) are delivered to the FLUS sink that is located in the network.

Another example scenario is pre-production on-site, where one or more contribution streams from FLUS sources are delivered to the FLUS sink that is located at or in proximity of the event being covered. The FLUS sink may be connected to a media production system. Some production process may be done locally, then media stream feeds may in some cases be provided to further remote located production system, for final production remotely from the event.

A further scenario is Final production on site, where a single stream production feed delivered from a single FLUS source to the FLUS sink in the network for onward distribution.

For the last two scenarios, FLUS can be used locally to capture media streams from some or all of the equipment in use. A separate FLUS connection is used to deliver the (pre-) produced media stream(s), if applicable.

Each scenario of the media production has several production levels available highly compressed, lightly compressed, uncompressed. Several media formats are defined within each of these production levels.

In scenarios like the ones described above, it may be advantageous to allow the production system control the FLUS sessions, as well as the capture devices and media stream(s) that are delivered. However, in the current FLUS specification it is possible only for the FLUS source to control FLUS sessions. Hence, a solution where the FLUS session is controlled from the FLUS sink is proposed. For example, the FLUS sink may initiate FLUS sessions to one or to multiple FLUS sources. Thereby, media production may be made more efficient. Similarly, the processes of FLUS session update and FLUS session termination also need to be enabled for execution by the FLUS sink.

Furthermore, with professional media production systems, sometimes the production personnel, e.g. the camera operators, receive one or more feedback media streams, for monitoring purposes. One example is when the final production output media stream is relayed back to the production personnel at each capture device. It is herein also proposed to include these downlink streams within the FLUS system.

With professional media production systems it is also common practice that production personnel communicate with the production system, and/or among themselves, during the production. Hence, manned capture devices, usually professional video cameras, need to be able to handle bi-directional media streams for the purpose of communications. It is herein proposed to include these communication streams within the FLUS system.

Consideration of these variants within the media production use case gives rise to several extensions needed in FLUS, which are addressed with the proposed solution that will now be described with reference to FIG. 1 to FIG. 6.

FIG. 1 depicts media production system 1 that utilizes an extended FLUS architecture for implementing the proposed technique. FIG. 1 illustrates a wireless device 10 (in 3GPP called User Equipment, UE) comprising a FLUS source 100 and a network node 20 comprising a FLUS sink 200. The wireless device 10 comprises a capturing device 11, such as a camera. The wireless device 10 communicates with a production system 30 via the network node 20 using a FLUS session between the FLUS source 100 and the FLUS sink 200. The production system 30 is a functionality that may receive media sources from one or more wireless devices 10 comprising capture devices 11 as described above. The received media could be audio and video content. The production system 30 may use selected parts of the received media to combine into a final audio and video stream that may be distributed to e.g. a distribution network and e.g. stored in a media server or directly (live production) distributed to a number of viewers of the event, e.g. via a broadcasting network. The production system 30 may wish to control the capture devices 10 in different manners, e.g. for start and stop of recording, movement of the camera, or for adjustment of the camera configuration (e.g. pan, tilt, zoom). Further, the production system 30 may communicate with the personnel manually controlling camera devices, e.g. to perform adjustments as of above, in case the camera is manually controlled. The production system 30 may be autonomously run by a production software, or controlled by one or more persons or combinations by a combination thereof.

The extended FLUS architecture 1 comprises support for return media stream(s) and communication facility. More specifically, the wireless device 10 comprises feedback devices 12 such as a display mechanism, where a user of the wireless device may e.g. see the final production during the live streaming. For example, a camera man may see what is currently casted. The wireless device 10 also comprises a communication device configured to enable communication with other members of a production team. The communication device is for example a microphone and a speaker, e.g. a headset dedicated for communication. In FIG. 1 the return media stream is depicted as F-U-D and the original contents of the F-U interface, the uplink media stream(s) are denoted F-U-U.

The return media stream(s) can be defined to flow between the FLUS sink to the FLUS source, or it could be defined outside of the FLUS functional entities. FIG. 1 illustrates it as being a component of the F-U interface. In any case it is recognized as a feature of the media production system 1 that utilizes FLUS, and it is a component media stream of the FLUS session in which the media coverage is being uplinked. In FIG. 1, the communications media flow, which is bidirectional, is depicted as F-U-M.

The communications media stream(s) can also be defined to flow between the FLUS sink and the FLUS source, or it could be defined outside of the FLUS functional entities. FIG. 1 illustrates it as being a component of the F-U interface. In any case it is recognized as a feature of the media production system that utilizes FLUS, and it is a component media stream of the FLUS session in which the media coverage is being uplinked.

Figure 2:
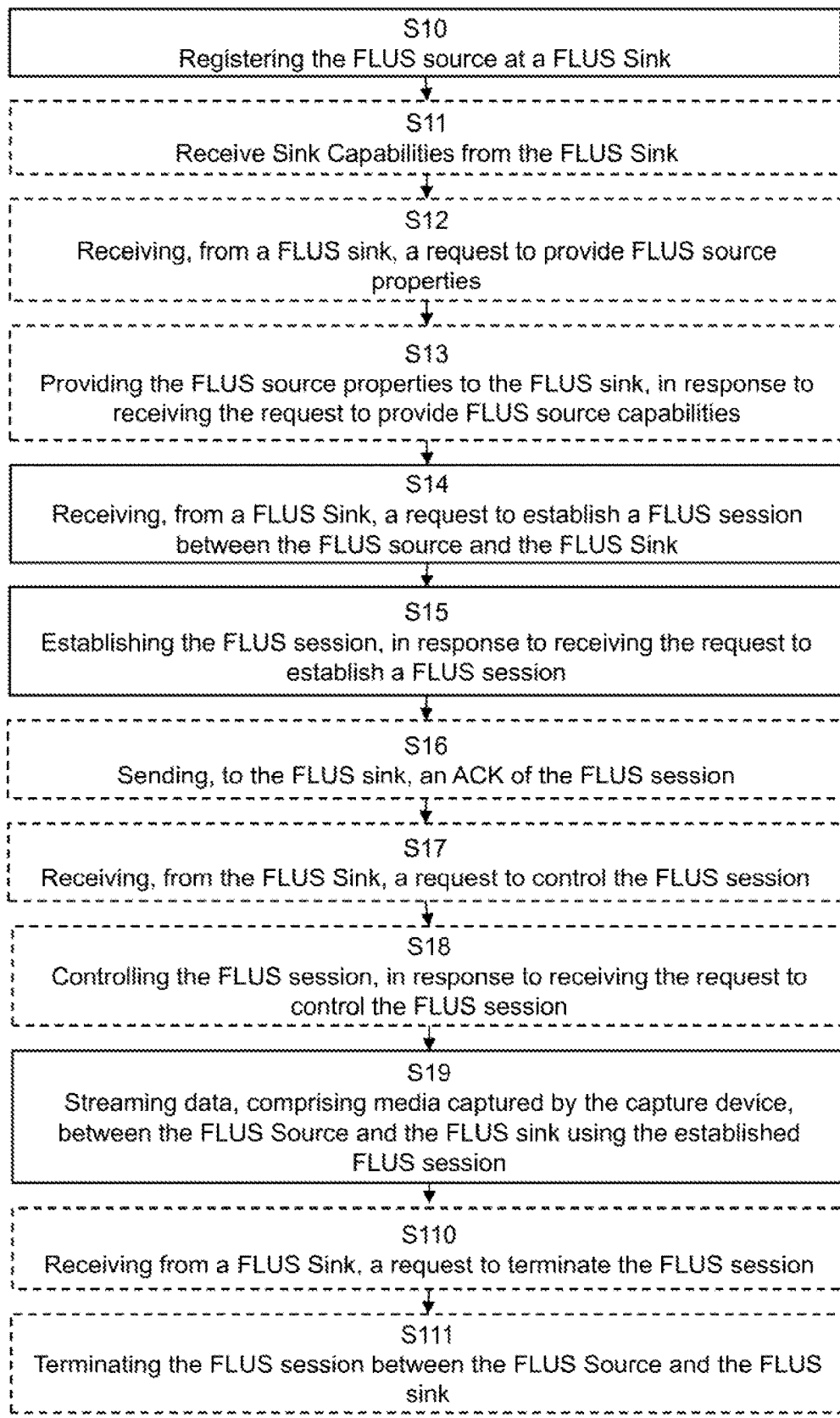
FIG. 2 illustrates signaling between a FLUS source and a FLUS sink according to some example embodiments.
Figure 3:
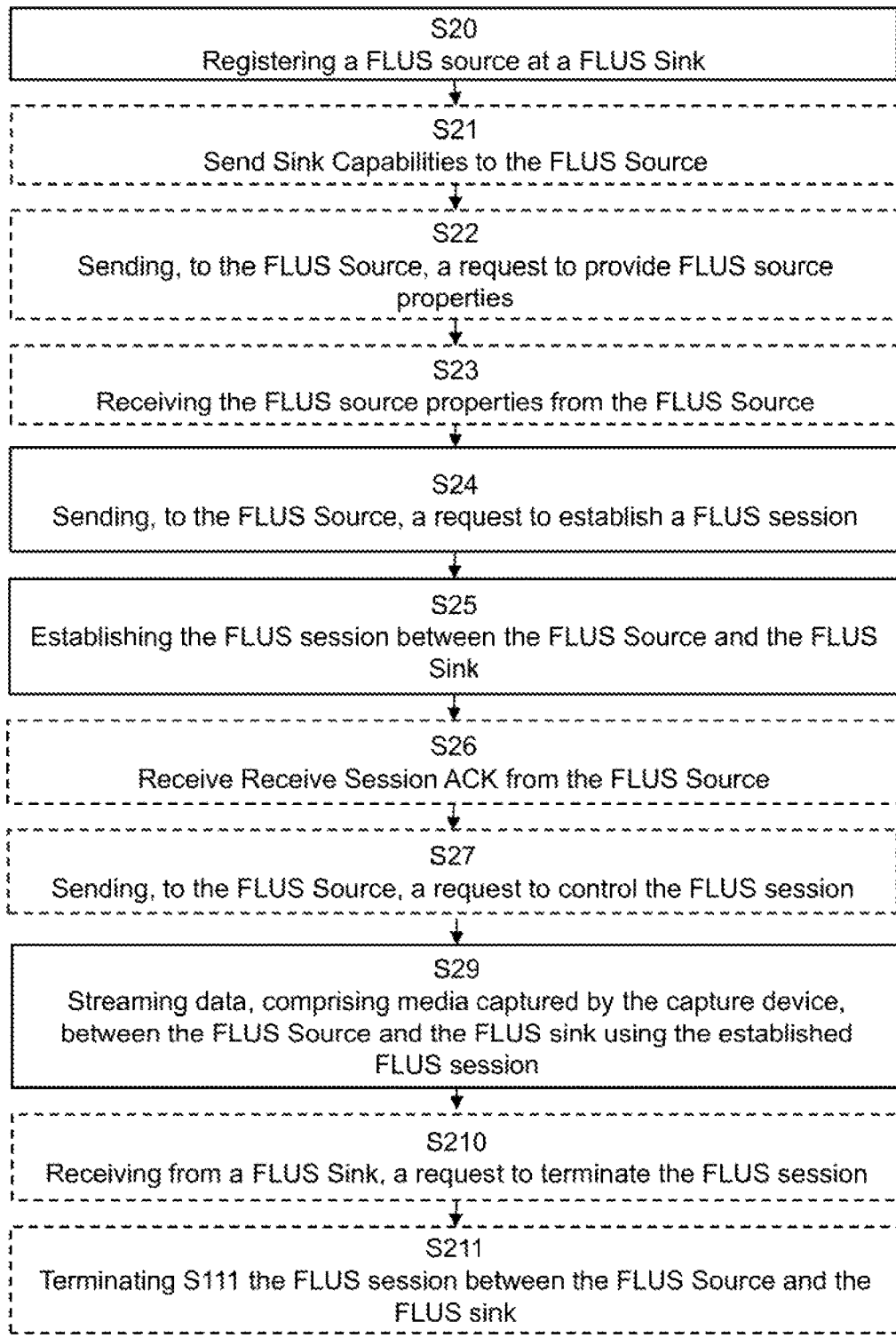
FIG. 3 is a flow charts illustrate a method for use in a wireless device.
Figure 4:
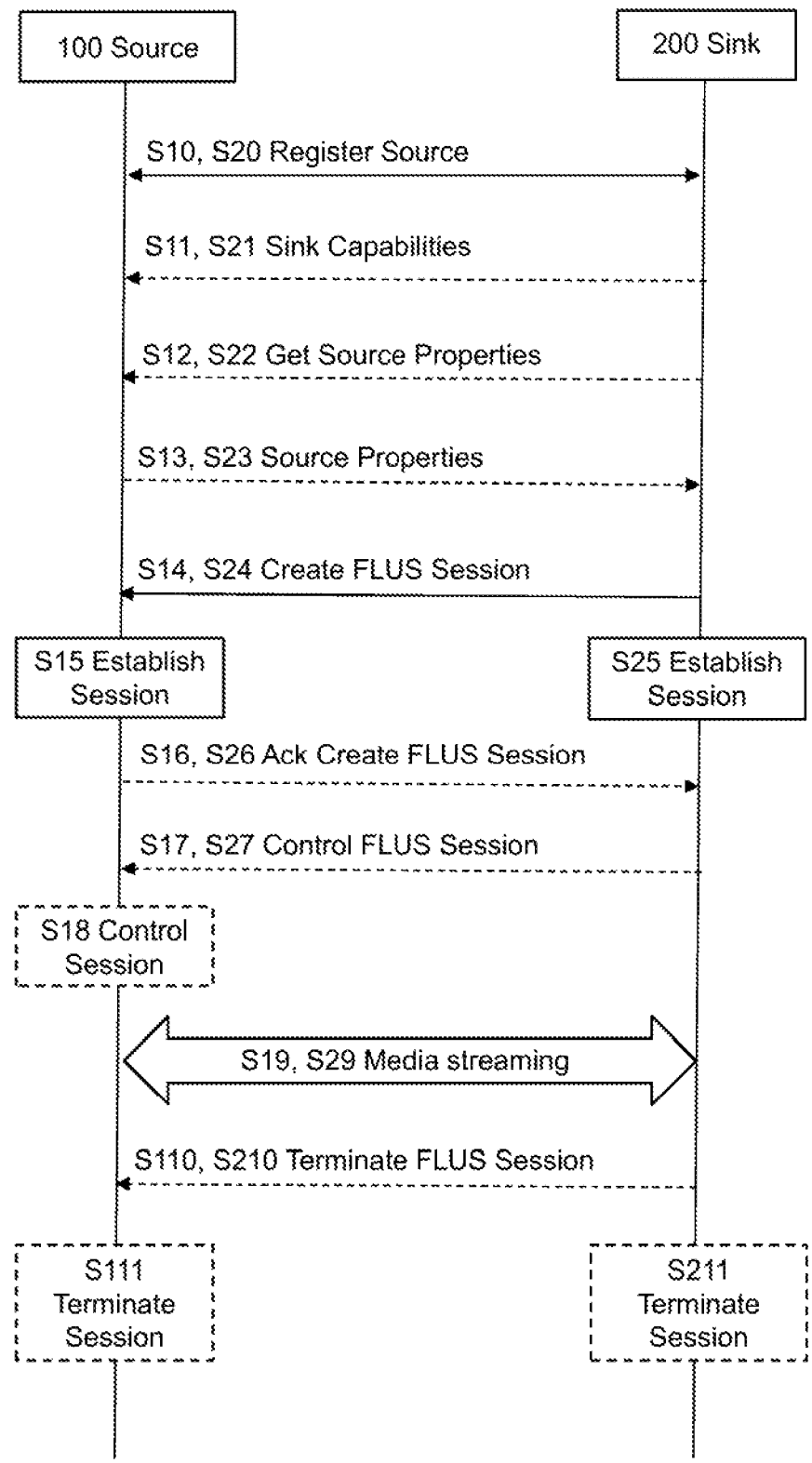
FIG. 4 is a flow charts illustrate a method for use in a network node.

The flow chart of FIG. 2 shows the proposed method performed in a wireless device 10 comprising a FLUS source 100 for establishing a streaming session in a Framework for Live Uplink Streaming, FLUS. FIG. 3 shows the corresponding method in a network node 20 comprising a FLUS sink. FIG. 4 illustrates the signaling between the FLUS source 100 in the wireless device 10 and the FLUS sink 200 in the network node, while performing the methods.

Even though FIG. 1 only depicts one wireless device 10 it must be appreciated that in a media production system there are typically several wireless devices 10 with respective media capture devices 10 arranged to deliver media streams or files to be uplinked using FLUS.

Figure 5:
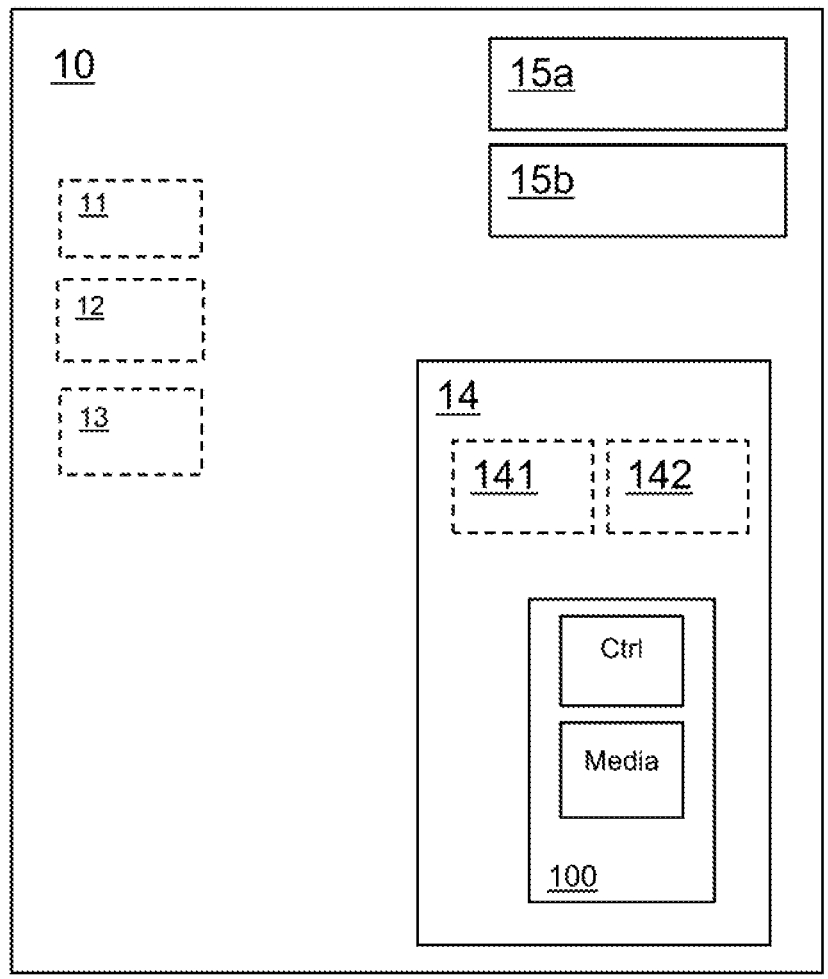
FIG. 5 is an example embodiment of a wireless device comprising a FLU Source.

The proposed method for use in a wireless device will now be described with reference to FIG. 2. The method is typically performed in control circuitry 14 of a wireless device 10, such as the wireless device 10 of FIG. 1, or more specifically by a FLUS source 100 of such a control circuitry 14 (FIG. 5). The method is typically performed during media production. The method may be implemented as a computer program comprising instructions which, when the program is executed by a computer (e.g. a processor in the control arrangement 11), cause the computer to carry out the method. According to some embodiments the computer program is stored in a computer-readable medium (e.g. a memory or a compact disc) that comprises instructions which, when executed by a computer, cause the computer to carry out the method.

As each wireless device 10 (comprising a FLUS source 100) is set up and prepared for the production it proceeds, either by manual trigger or autonomously, to register with the network node 20 (comprising a FLUS sink 200) and remote production system 30. This part of the process takes place as already foreseen in the present FLUS specification 3GPP TS 26.238 V15.1.0. In other words, the method comprises registering S10 the FLUS source at a FLUS sink. In connection with the registering the FLUS source will typically also receive S11 the Sink Capabilities from the FLUS sink 200 using the procedure already defined in the FLUS specification 10.

Once the FLUS source 100 is known to the FLUS sink 200, and if applicable, also to the remote production system 30, the process changes from that currently described in the present FLUS specification. From this stage onwards it is the FLUS sink 200 that exercises control over the FLUS source 100 as regards FLUS session establishment and management, and remote control of the capture devices, if applicable.

For media production systems using FLUS it may be necessary for the FLUS sink 200 to discover the properties of the FLUS source 10. Thus the FLUS source device 10 is typically configured to report its basic FLUS-related functionality (or capability) and/or present status to the FLUS sink 20. Basically, the FLUS sink 200 may uses the same procedure as already defined in the FLUS specification for the FLUS source 10, to retrieve S11 the capabilities of the FLUS source 100 and its attached media capture device(s). As well as the inherent capabilities of the FLUS source 10, a status retrieval information exchange is foreseen, which is useful for confirming the current status of dynamic capabilities, e.g. mobility and power mode. In other words, in some embodiments, the method comprises receiving 512, from a FLUS sink, a request to provide FLUS source properties and providing S13 the FLUS source properties to the FLUS sink, in response to receiving the request to provide FLUS source properties. Alternatively, the FLUS source 100 may report the properties on own initiative. The FLUS source properties comprises e.g. FLUS source capabilities and/or status. The properties may be reported before establishing the FLUS session or at any time during the FLUS session.

Example of capabilities of a FLUS source 100, such as an unmanned camera that may be reported are e.g. ability to accept control of FLUS sessions from the FLUS sink 200 and ability to receive a return video feed for manual monitoring. Other examples of FLUS source capabilities are available video format(s), available audio format(s), available ancillary streams such as subtitles, captions and content metadata.

The reported capability of the FLUS source may also be connectivity related. Thus, the reported capabilities may specify supported communication technologies, radio access networks, RAN e.g. wired and which system/s.

The reported capability may also specify whether the capturing device 11 may be remotely controlled. For example, a capturing device may be defined by a as being "remotely controllable", "manual", and/or "none" (i.e. not controllable). The capabilities may also define which system/s or protocols supported by the capturing device for such remote control. Different protocols are available on the market, and the capturing device may indicate support for one or more of such protocols, e.g. VISCA protocol, UVC protocol or ONVIF protocol.

A FLUS source capture device mounted on a drone might be airborne for some time (status: airborne) but need to dock for charging intermittently, whereby the charging dock is positioned such that a useful media stream can continue to be delivered while the drone is docked (status: fixed). In some scenarios it is useful for the production system 30, via the FLUS source 100, to recognize the related status. In other words, an example of a status is "flying" or "docketed" etc.

Thus, the FLUS source may report status parameters such as "Mobility state" (e.g. fixed, on foot, ground vehicle, airborne vehicle, surface water vehicle, underwater) and "Power state" (e.g. Battery, Battery with autonomous charging, power outlet/cable supplied)

In contrast to the prior art, a FLUS session is then created by the FLUS sink 20. In other words, the method further comprises receiving S14, from the FLUS sink, a request to establish a FLUS session between the FLUS source and the FLUS sink. Upon receiving the instruction to create a FLUS session, the FLUS source begins to set up the FLUS session. It is assumed that the FLUS source 100 has acquired the necessary information to establish an F-C connection to the FLUS sink 200 in the previous steps. Typically, The FLUS sink 200 provides a valid access token and upon successful creation, the FLUS source 100 responds with the resource id of the created session. In other words, the method further comprises establishing S15 the FLUS session, in response to receiving the request to establish a FLUS session. In one example, the FLUS sink establishes the FLUS session or requests establishment of the FLUS session by sending an HTTP message (e.g. a HTTP request) to a pre-determined URL associated with the FLUS source.

The FLUS session comprises a control plane and a user plane (comprising an uplink media stream F-U-U) as described in 3GPP TS 26.238. The user plane is some embodiments extended with return (Downlink) media streams F-U-D and communication media streams, F-U-M.

In some production situations, a media feed is sent back to the FLUS source device for monitoring purposes. For example, a camera man might have a small monitor attached to the side of the camera to view the output stream of the ongoing production. Hence this feature is proposed to be added to the FLUS session. While the feedback stream is not an uplink per se, it may be efficient include a downlink return media stream F-U-R in the FLUS system, so that it can be managed logically within the same framework as the uplink media stream(s) delivered by the same FLUS source. In principle there could be multiple downlink media streams F-U-D.

In some production situations, it is necessary for the production system to communicate in real time with camera personnel, to execute direction for the coverage. Hence, a bidirectional data flow that is separate to the media stream(s) being captured, is proposed. The communication can be individually to each FLUS source, and/or among all participants, both at the production system and among the capture equipment personnel at the same time. It may be efficient to include the F-U-M in the FLUS system since the same physical medium is used for communications as for uplink stream delivery.

In other words, in some embodiments, the established FLUS session comprises at least one of; an uplink media stream F-U-U, a downlink media stream F-U-D and a communication data stream F-U-M.

For advanced production, it may be efficient to let the production system control the FLUS sessions as well as of the capture devices 10 and media stream(s) that are delivered. In some scenarios, such as for a drone, this is the only way to enable control as there is no other possibility to control the wireless device 10 comprising the FLUS source 100. Thus, in some embodiments, the method comprises receiving S17, from the FLUS sink, a request to control the FLUS session and controlling S18 the FLUS session, in response to receiving the request to control the FLUS session. The control request may include control information (e.g. a control commands, configuration information, etc. Accordingly, controlling S18 the FLUS session may include controlling or configuring the FLUS session in accordance with the control information.

The controlling S18 may be performed before the actual streaming is started. In other words, the FLUS sink may configure the FLUS session. For example, by first configuring the wireless device 10 and secondly requesting the capture device 10 to start media capturing and media streaming. The controlling can be performed independently of whether a streaming of media is ongoing or not, e.g. initiated before the actual streaming is started. The controlling S18 may be performed anytime during, before or after establishing the streaming session.

The method further comprises streaming S19 data, comprising streaming media captured by the capture device, between the FLUS source and the FLUS sink using the established FLUS session. The FLUS sink 200 may control the FLUS sink to start media streaming or stop media streaming.

In some embodiments, the FLUS sink 200 may continue to control the FLUS session during the FLUS session. In other words, in some embodiment the controlling S18 comprises remotely controlling media streaming or the capturing of media by a remote entity, (e.g. the FLUS sink 200, or another remote control entity (which may be co-located with FLUS sink 200), etc.). For example, the FLUS sink 200 may adapt data rate of media streams or the optical parameters (e.g. white balance) of the capture device 10. From the perspective of FLUS source 100, controlling may include allowing remote control of the data stream or capturing of media. The FLUS source 100 may execute control commands (e.g., data rate adaptations, changes to optical parameters) sent by the FLUS sink 200. Thus, the FLUS session is remotely controlled by the FLUS sink or the remote control entity.

If the establishing of the FLUS session is controlled by the FLUS sink, then the FLUS sink 200 may typically also control the termination of the FLUS session. In other words, in some embodiments, the method comprises receiving 5110 from a FLUS sink 20, a request to terminate the FLUS session, and terminating 5111 the FLUS session between the FLUS source 100 and the FLUS sink 20, in response to receiving the request.

The corresponding method, for use in a network node 20, for establishing a media streaming session in a Framework for Live Uplink Streaming, FLUS will now be described with reference to FIG. 3. The method of FIG. 3 is e.g. performed by a control arrangement 24 (FIG. 6) of a network node 20. More specifically, the method is performed by the so called FLUS sink which is a logical function of a wireless communication network. The method may be implemented as a computer program comprising instructions which, when the program is executed by a computer (e.g. a processor 241 in the control arrangement 24), cause the computer to carry out the method. According to some embodiments the computer program is stored in a computer-readable medium (e.g. a memory or a compact disc) that comprises instructions which, when executed by a computer, cause the computer to carry out the method.

The method comprises registering S20 one or more FLUS sources 10 at the FLUS sink and send its Sink Capabilities to the FLUS sources 10, as described in connection with FIG. 2. Typically, several FLUS sources 10 are registered at the FLUS sink 20. However, for simplicity the method is described with reference to one single FLUS source 10. It must be appreciated that the method is typically performed for each FLUS source 10.

The FLUS sink 20, or rather a user of the FLUS sink 200 such as the production system 30, may wish to acquire information about FLUS sources 10 that are available for use (i.e. registered) by the FLUS sink 20. Thus, in some embodiments, the method comprises sending S22, to the FLUS source 10, a request to provide FLUS source properties, and receiving S23 the FLUS source properties from the FLUS source 10. The FLUS sink will then get information about the capabilities of registered FLUS sources 10. This information may be forwarded to the production system 30. The production system may then select suitable FLUS sources 10 for a certain production based on their capabilities.

The method then comprises sending S24, to a FLUS source, a request to establish a FLUS session. In one example, the FLUS sink 200 may send an HTTP request to a pre-determined URL associated with the FLUS source 100. The FLUS sink 200 and the FLUS source 100 then performs steps required for completing session establishment. In other words, the method comprises establishing S25 the FLUS session between the FLUS source 100 and the FLUS sink 20. When the session is established the FLUS sink 200 may receive S26 a confirmation (ACK) from the FLU source 10 comprising a session ID.

When the session has been established the FLUS sink 200 may continue to control the FLUS session. In some embodiments, the FLUS sink 200 may remotely modify or re-configure the properties of the established session. The procedure may allow modification of individual properties or all properties. The FLUS sink updates the resource identified by the id of the session. In other words, in some embodiments, the method comprises sending S27, to the FLUS source, a request to control the FLUS session. Such a request may be sent before the streaming is started or anytime during the streaming. More specifically, in some embodiments, the request is configured to request the FLUS source to configure (or re-configure) the FLUS session. The configuration may be done before starting the session or during the session.

The proposed method further comprises the step of streaming S29 data between the FLUS source 100 and the FLUS sink 200 using the established FLUS session. In some embodiments, the FLUS sink 200 causes the FLUS source 100 to start and stop media streaming. In other words, in some embodiments, the request (step S27) to control the FLUS session is configured to request the FLUS source 100 to start and/or stop the media streaming.

In some embodiments, the request is configured to request the FLUS source 100 to remotely control the media streaming and/or media capturing. For example, the streaming rate or optical configuration used by the wireless device 10 may be controlled remotely. This may either be done before establishing the session or any time during the FLUS session.

In some embodiments, the established FLUS session comprises one or more of; an uplink media stream, a downlink media stream and a communication stream, see above.

In some embodiments, the method comprises sending 5210, to a FLUS source 10, a request to terminate the FLUS session 20, and terminating 5211 the FLUS session.

FIG. 5 illustrates an example implementation of a wireless device 10 configured to implement the proposed method for establishing a streaming session in a Framework for Live Uplink Streaming, FLUS.

The term "wireless device" herein refers to any type of communication device capable of communicating with the network node 20, for e.g. a (professional) camera equipped with (or having access to) a modem, a mobile terminal or a wireless terminal, a mobile phone, a computer such as e.g. a laptop, a Personal Digital Assistants (PDAs) or a tablet computer, with wireless capability, target device, device to device UE, MTC UE or UE capable of machine to machine communication, iPAD, mobile terminals, smart phone, Laptop Embedded Equipment (LEE), Laptop Mounted Equipment (LME), USB dongles etc. or any other radio network units capable to communicate over a radio link in a wireless communications network.

The wireless device 10 comprises a capture device 11, a feedback device 12, a communication device 13, control circuitry 14 and a communication interface 15 for wireless signals (comprising a transmitter 15*a* and a receiver 15*b*). In some embodiments the capture device 11 is external to the wireless device 10. For example, the capture device 11 is a professional camera connected to a wireless device 10 being a modem.

The capture device 11 is e.g. a professional camera or microphone. The capture device 11 may also be a simple camera, such as a mobile phone camera.

The feedback device 12 is a device configured to provide feedback to an operator of the wireless device 10. The feedback may be visual and/or audible or any other type of feedback. The feedback device 12 is e.g. a relatively small display.

The communication device 13 is a device configured to enable an operator of the wireless device 10 to communicate with other operators of devices in the system 1. For example, it may enable the operator to communicate with other operators of other wireless devices 10 comprising FLUS sources 100 over one or more dedicated (media) streams (F-U-M), as explained above. The communication device 13 may comprise a microphone and/or a speaker.

The control circuitry 14 is configured to control the operation of the wireless device 10. The control circuitry 14 typically comprises one or more processors 141 and a memory 142. One or more programs are stored in the memory 142 and are configured to be executed by the one or more processors 141. The one or more programs include instructions implementing a FLUS source 100.

More specifically, the one or more programs include instructions that cause the wireless device 10 to register the FLUS source 100 at a FLUS sink 200, to receive, from a FLUS sink, a request to establish a FLUS session between the FLUS source and the FLUS sink, to establish the FLUS session, in response to receiving the request to establish a FLUS session, and to stream data, comprising media captured by the capture device, between the FLUS source and the FLUS sink using the established FLUS session.

In general the wireless device, or rather the control circuitry 14 is configured to perform the method according to the first aspect.

The communication interface 15 is configured to enable communication with other devices e.g. with a production system 30 via a wireless communication network (e.g. a 4G or 5G network). For example a connection using Internet Protocol may be established between the electronic device 10 and the production system 30.

Figure 6:
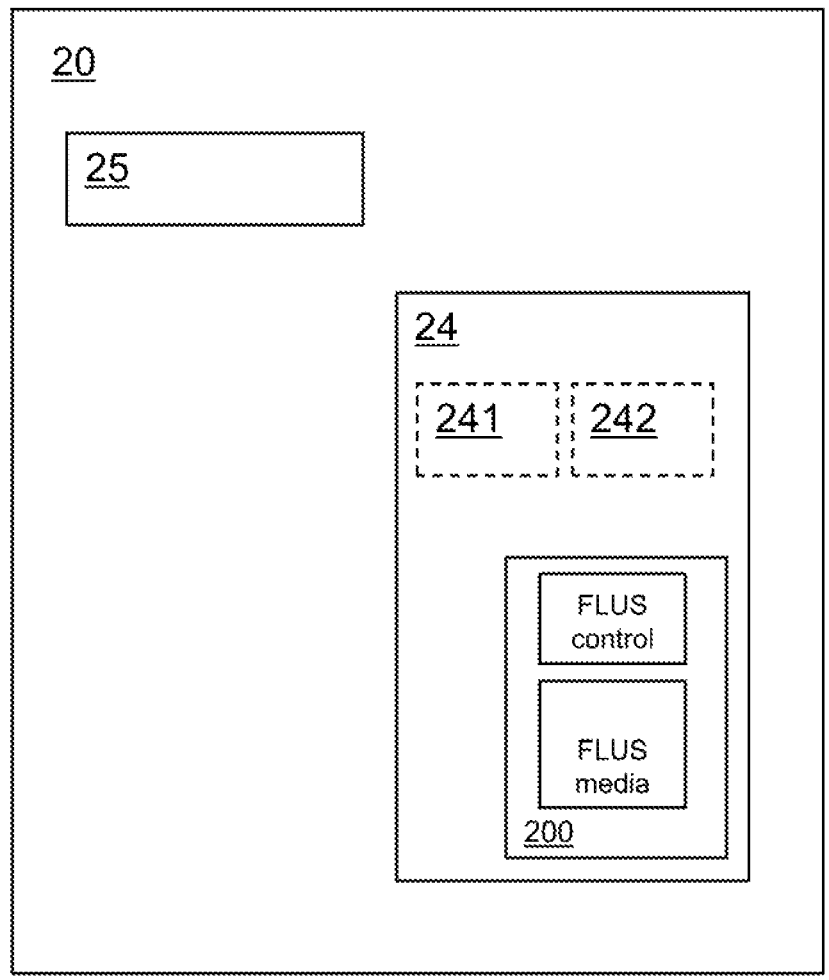
FIG. 6 is an example embodiment of a network node comprising a FLU Sink.

FIG. 6 illustrates an example implementation of a network node 20 comprising control circuitry 24 implementing a FLUS sink and a communication interface 25. The network node is e.g. a core network node in a communication network. The network node 20 may be a node in a functional sense. Hence, the implementation may be distributed between several physical units of the communication network.

The control circuitry 24 is configured to control the operation of the network node 10. The control circuitry 24 typically comprises one or more processors 241 and memory 242. One or more programs are stored in the memory 242 and are configured to be executed by the one or more processors 241. The one or more programs include instructions implementing a FLUS sink 200.

More specifically, the control circuitry 24 is configured to cause the network node 20 to register a FLUS source at the FLUS sink, to send, to a FLUS source, a request to establish a FLUS session, to establish the FLUS session between the FLUS source and the FLUS sink, and to stream data between the FLUS source 100 and the FLUS sink 200 using the established FLUS session.

In general the network node 20, or rather the control circuitry 24 is configured to perform the method to the second aspect.

Figure 7:
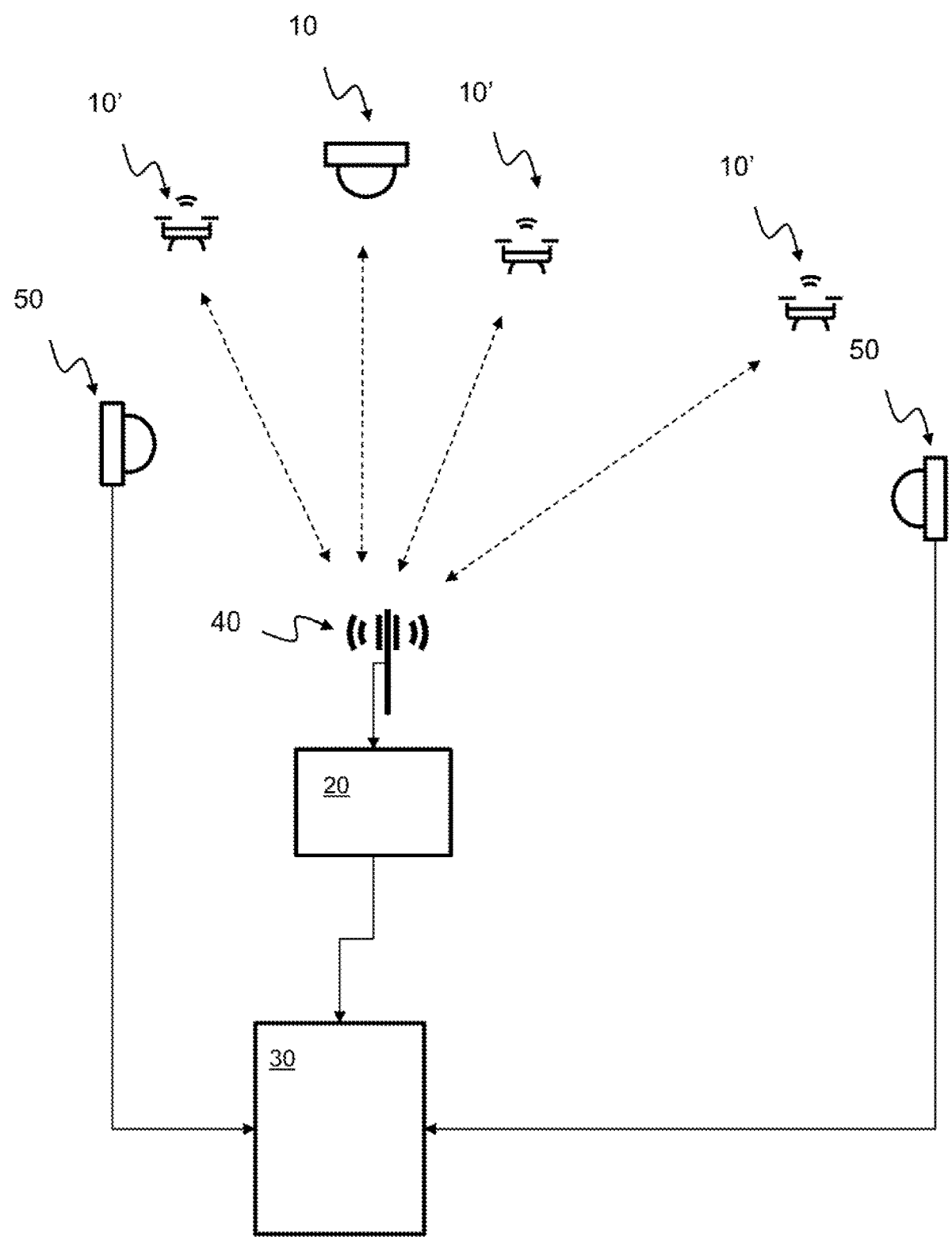
FIG. 7 illustrates an example scenario where the proposed technique may be implemented.

FIG. 7 illustrates an example scenario where the proposed technique may be implemented. In FIG. 7 several wireless devices 10, 10' (comprising FLUS sources) are registered at a FLUS sink 30. Some of the wireless devices 10, 10' are stationary cameras 10 while others are mobile cameras 10', here illustrated as drones. A production system 30 communicates with the wireless devices 10 (via access points 40 of e.g. a 5G network) as well as with some stationary cameras 50. By using the proposed technique the production system 30 may control the wireless devices 10, 10' to start and stop capturing and streaming video. The production system 30 may also control the properties of the streaming and the capturing. Hence, a media production may be created in an efficient way, completely (or partly) controlled from the production center 30.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the embodiments, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

What is claimed is:

1. A method, performed at a wireless device implementing a Framework for Live Uplink Streaming (FLUS) source, for establishing a streaming session, comprising:
registering the FLUS source at a FLUS sink;

receiving, from the FLUS sink, a request for FLUS source capabilities;
providing properties of the FLUS source to the FLUS sink, in response to the request for FLUS source capabilities;
receiving, from the FLUS sink, a request to establish a FLUS session between the FLUS source and the FLUS sink;
establishing the FLUS session, in response to receiving the request from the FLUS sink;
streaming data, comprising media captured by a capture device, between the FLUS source and the FLUS sink using the FLUS session established;
receiving, from the FLUS sink, a control request including control information for the FLUS session; and
controlling the FLUS session in response to the control request from the FLUS sink and according to the control information in the control request.

2. The method according to claim 1, wherein the properties of the FLUS source indicate at least one of:
available video format(s);
available audio format(s);
available ancillary streams;
available connectivity types;
remote control capabilities;
mobility properties of the wireless device; or
power source properties of the wireless device.

3. The method according to claim 1, wherein the FLUS session includes at least one of an uplink media stream, a downlink media stream, or a voice communication stream.

4. The method according to claim 1, wherein controlling the FLUS session comprises at least one of:
configuring the FLUS session according to the control information in the control request;
starting media streaming to the FLUS sink;
allowing remote control of data streaming from a remote entity, and stopping media streaming between the FLUS source and the FLUS sink.

5. The method according to claim 1, further comprising:
receiving, from a FLUS sink, a request to terminate the FLUS session, and terminating the FLUS session between the FLUS source and the FLUS sink, in response to receiving the request.

6. A method, performed at a network node implementing a Framework for Live Uplink Streaming (FLUS) sink, for establishing a media streaming session, comprising:
registering a FLUS source at the FLUS sink;
sending, to the FLUS source, a request for FLUS source capabilities; and
receiving properties of the FLUS source, from the FLUS source, in response to the request for FLUS source capabilities;
sending, to the FLUS source registered at the FLUS sink, a request to establish a FLUS session;
establishing the FLUS session between the FLUS source and the FLUS sink;
streaming data between the FLUS source and the FLUS sink using the FLUS session established:
sending, to the FLUS source, a control request including control information for the FLUS session, wherein the FLUS source controls the FLUS session in response to the control request and according to the control information in the control request.

7. The method of claim 6, wherein the FLUS session includes at least one of an uplink media stream, a downlink media stream, or a voice communication stream.

8. The method according to claim 6, wherein the control request is a request for, one or more of:
configuring or re-configuring the FLUS session;
starting the media streaming at the FLUS source;
remotely controlling the media streaming; and
stopping the media streaming at the FLUS source.

9. The method according to claim 6, comprising:
sending, to the FLUS source, a request to terminate the FLUS session; and terminating the FLUS session.

10. A network node comprising control circuitry implementing a FLUS sink, wherein the control circuitry is configured to cause the network node to carry out the method of claim 6.

11. The network node according to claim 10, wherein the network node is further configured to perform the method according to claim 6.

12. A wireless device comprising a capture device, a wireless communication interface, and control circuitry implementing a FLUS source, wherein the control circuitry is configured to cause the wireless device to:
register the FLUS source at a FLUS sink;
receive, from the FLUS sink, a request for FLUS source capabilities;
provide properties of the FLUS source to the FLUS sink, in response to the request for FLUS source capabilities;
receive, from the FLUS sink, a request to establish a FLUS session between the FLUS source and the FLUS sink;
establish the FLUS session, in response to receiving the request to establish the FLUS session from the FLUS sink;
stream data, comprising media captured by the capture device, between the FLUS source and the FLUS sink using the FLUS session established;
receive, from the FLUS sink, a control request including control information for the FLUS session; and
control the FLUS session in response to the control request from the FLUS sink and according to the control information in the control request.

* * * * *